(12) United States Patent
Riza

(10) Patent No.: US 8,170,384 B1
(45) Date of Patent: May 1, 2012

(54) HYBRID PHOTONIC SIGNAL PROCESSING MODULES

(75) Inventor: Nabeel A. Riza, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 230 days.

(21) Appl. No.: 12/398,472

(22) Filed: Mar. 5, 2009

Related U.S. Application Data

(60) Provisional application No. 61/068,789, filed on Mar. 10, 2008.

(51) Int. Cl.
*G02B 6/26* (2006.01)
*G02B 6/42* (2006.01)

(52) U.S. Cl. .............................. 385/27; 385/31; 385/39

(58) Field of Classification Search .................. None
See application file for complete search history.

(56) References Cited

U.S. PATENT DOCUMENTS

| | | | |
|---|---|---|---|
| 5,117,239 A | 5/1992 | Riza | |
| 5,187,487 A | 2/1993 | Riza | |
| 5,191,339 A | 3/1993 | Riza | |
| 5,208,880 A | 5/1993 | Riza et al. | |
| 5,231,405 A | 7/1993 | Riza | |
| 5,274,381 A | 12/1993 | Riza | |
| 5,274,385 A | 12/1993 | Riza | |
| 5,307,073 A | 4/1994 | Riza | |
| 5,319,477 A | 6/1994 | DeJule et al. | |
| 5,329,118 A | 7/1994 | Riza | |
| 5,345,321 A | 9/1994 | DeJule et al. | |
| 5,373,393 A | 12/1994 | DeJule et al. | |
| 5,400,038 A | 3/1995 | Riza et al. | |
| 5,410,147 A | 4/1995 | Riza et al. | |
| 5,477,350 A | 12/1995 | Riza et al. | |
| 5,512,907 A | 4/1996 | Riza | |
| 5,532,860 A | 7/1996 | Hershey et al. | |
| 5,568,286 A | 10/1996 | Riza | |
| 5,594,565 A | 1/1997 | DeJule et al. | |
| 5,617,109 A | 4/1997 | DeJule et al. | |
| 5,694,216 A | 12/1997 | Riza | |
| 5,718,226 A | 2/1998 | Riza | |
| 5,731,790 A | 3/1998 | Riza | |
| 6,031,658 A | 2/2000 | Riza | |
| 6,222,954 B1 | 4/2001 | Riza | |
| 6,282,336 B1 | 8/2001 | Riza | |
| 6,360,037 B1 | 3/2002 | Riza | |
| 6,525,863 B1 | 2/2003 | Riza | |

(Continued)

*Primary Examiner* — Uyen Chau N Le
*Assistant Examiner* — Chad Smith
(74) *Attorney, Agent, or Firm* — Brian S. Steinberger; Phyllis K. Wood; Law Offices of Brian S. Steinberger, P.A.

(57) ABSTRACT

Methods, systems, apparatus and devices for a variable fiber optic delay line that includes an electro-optic modulator for receiving and modulating an input signal, a switchless discrete long time delay module for injecting a long time delay into the modulated signal to produce a long delayed signal, and a switchless analog variable short delay module injecting a variable short time delay into the long delayed signal for a delayed output signal having a delay approximately equal to the long plus the short time delay. The module may also include non-dispersive single mode fibers for transmission between components and a circulator coupled for routing the input signal to the discrete long time delay module and routing the first delayed output signal to the analog variable short delay module. The VFODL can be used for Radio Frequency, digital electrical signals requiring time delay and amplitude processing or optical signal processing.

9 Claims, 14 Drawing Sheets

U.S. PATENT DOCUMENTS

| | | | |
|---|---|---|---|
| 6,542,228 B1 * | 4/2003 | Hartog | 356/73.1 |
| 6,563,974 B2 | 5/2003 | Riza | |
| 6,687,036 B2 | 2/2004 | Riza | |
| 6,859,578 B2 | 2/2005 | Riza | |
| 6,885,807 B2 | 4/2005 | Riza | |
| 6,922,233 B2 | 7/2005 | Riza | |
| 6,982,818 B2 | 1/2006 | Riza et al. | |
| 7,092,079 B2 | 8/2006 | Riza et al. | |
| 7,180,602 B2 | 2/2007 | Riza et al. | |
| 7,283,216 B1 * | 10/2007 | Geng et al. | 356/35.5 |
| 7,327,472 B2 | 2/2008 | Riza et al. | |
| 7,627,253 B1 * | 12/2009 | Ng | 398/161 |

* cited by examiner

HYBRID PHOTONIC SIGNAL PROCESSING MODULES

This application claims the benefit of priority to U.S. Provisional application No. 61/068,789 filed on Mar. 10, 2008.

FIELD OF INVENTION

This invention relates to signal processing and, in particular, to methods, systems, apparatus and devices for hybrid analog-digital control variable optical delay lines using optimized laser wavelength selection/tuning in combination with spatial dispersive elements coup led with optical fibers and temporally dispersive optical delay elements to generate near continuous time delays over a long time delay range.

BACKGROUND AND PRIOR ART

Search and tracking of fast moving objects requires fast moving high spatial resolution radar beams. To achieve this goal, phased array antennas/radars operate with wide instantaneous bandwidths that requires true time delay radar beamforming implemented with variable delay lines. In addition, radar testing also requires variable delay lines. Radar systems operate over varied radar bands from S-band to X-band, plus these radar systems have a varying number of independently driven antenna elements and/or sub-arrays.

Other applications where variable optical delay lines are required include electronic warfare, buffering in data routers, RF signal processors/transversal filters, adaptive filters, and test and instrumentation. Photonics is a desirable technology for implementing delay lines as it is essentially RF bandwidth and time delay range insensitive.

Ideally, the RF radar delay line requires all the following attributes: (a) Modular design to upgrade time delay ranges up-to 20 ns for beam forming, (b) High Resolution time delay control in sub-picoseconds over the entire range, (c) Fast speed from milliseconds for radar testing to nanoseconds for advanced radar beam forming, (d) Greater than 60 dB RF inter-channel and intra-channel noise suppression, (e) Low <10 dB RF loss for complete module, and (f) Near smooth none granular time delay controls of >16 effective bits. Uses of fast optical switches in realizing digitally switched N-bit (N 6 bits) optical delay lines makes the delay module very lossy (e.g., 20 dB loss).

Today, the desired low loss fast speed of nanoseconds reset time, high resolution wide time delay dynamic range variable optical delay line for RF signal processing is yet to be disclosed. Hence, the opportunity to realize such a variable optical delay line is very significant for commercial and aerospace applications. The methods, systems, apparatus and devices of the present invention provide a variable optical delay line design that can realize these difficult delay line requirements.

A variable fiber optic delay line (VFODL) is a highly sought after component with applications ranging from microwave/millimeter wave analog photonic signal processing to digital optical communication systems based on packet switching. The ideal VFODL is able to efficiently and continuously generate time delays with high temporal resolution over any given long time delay range.

Over the years, efforts have been made to realize these variable fiber optic delay lines, particularly for microwave photonics applications where an RF signal riding on an optical carrier needs to be provided with a desirable delay. One way to efficiently generate many time delays over a long time delay range uses an N-bit switched binary architecture that employs 2×2 digital switches to select given binary paths connected in a serial cascade architecture. Here, based on the delay range required, free-space, solid-optic, and fiber-based delay paths have been deployed in both serial and parallel switched architectures using a variety of switching technologies such as liquid crystals.

Because of the digital switched nature of these variable fiber optic delay lines, time delay resolution is quantized to a discrete value and there is a tradeoff between resolution and number of binary switched stages. In effect, getting smaller resolutions across larger time delay ranges means adding more cascading, leading to higher losses and greater module complexity. Hence a dilemma exists to get both high resolution and long time delay range while keeping loss numbers down.

A more recent and attractive technology for generating analog controlled time delays involves the use of wavelength tuning and Fiber Bragg Gratings (FBGs) or dispersive optical fibers. Initially discrete fiber Bragg gratings positioned along specified fiber paths were used to produce discrete time delays based on the wavelength chosen. Later the concept was extended to use a chirped Fiber Bragg Gratings to generate near continuous time delay for a phased array control application, but over short time delay range due to the fabrication size limitations of Fiber Bragg Gratings and the specified laser small tuning range.

There are other similar works in use of FBGs for variable optical delays. Use of dispersive fibers and wavelength tuning to get optical delays has also been disclosed. To get more delay settings within an efficient structure, multi-wavelength fiber time delay processing was proposed using discrete FBGs delay segments within a serial optical switched structure (N. A. Riza and N. Madamopoulos, "Phased-array antenna, maximum-compression, reversible photonic beam former with ternary designs and multiple wavelengths", in *Applied Optics-IP*, Vol. 36 (5), pp. 983-996 (1997).

More recently, efforts have replaced the standard high dispersion fiber in the R. Soref/R. Esman beamformer with a 6 times higher dispersion PCF as describe in Y. Jiang, et. al., "Dispersion enhanced photonic crystal fiber array for a true time delay structure X-band phased array antenna," IEEE Photon. Tech. Lett., Vol. 17, pp. 187-189, 2005 that leads to 6 times reduction in fiber lengths, although at the cost of higher optical losses. Another wavelength sensitive design for a time delay beamformer uses a single fixed CFBG but variable optical filters splits the N delayed wavelengths by a factor of N to distribute to the N-antenna elements causing an inefficient beamformer design as N scales to larger numbers.

In addition, wavelength tuning in combination with wavelength division multiplexer devices was also proposed to realize variable fiber optic delay lines as described in N. A. Riza and S. Sumriddetchkajorn, "Micromechanics-based wavelength-sensitive photonic beam control architectures and applications," in Applied Optics, Vol. 39, No. 6, pp. 919-932, February 2000. More specifically, the Arrayed Waveguide Grating (AWG) WDM device coupled with wavelength tuning has been extended to realize various VFODLs and RF filters as described in V Polo, B Vidal, J L Corral, J Marti, "Novel tunable photonic microwave filter based on laser arrays and N×N AWG-based delay lines," IEEE Photonics Technology Letters (PTL), Vol. 15, 2003 and B. Vidal, D. Madrid. J L Corral, V. Polo, J. Marti, "Novel Dispersion-based Optical Delay Line using Arrayed Waveguide Grating for Antenna Beamforming Applications," 28th European Optical Communication Conf. Proc. ECOC 2002, paper P3.17, Vol. 3, September 2002.

It is important to note that the V. Polo et. al. (2003 PTL paper) and B. Vidal ECOC 2002 papers use the periodicity of the AWG spectral response to feed multiple wavelengths into this specific arrayed waveguide grating WDM device with these wavelengths separated by the arrayed waveguide grating's free spectral range which limits time delay operations via dispersive fiber effects. Changing the wavelengths, but with the same separation given by the arrayed waveguide grating's free spectral range directs the light with many wavelengths into a different fiber port of the AWG device that has a different length of dispersive fiber; hence the time delay between the different wavelengths changes compared to light passing through another of the arrayed waveguide grating's fiber ports. In this case, long nanoseconds range time delays would need many km of dispersive fiber adding weight and temperature sensitivity to the variable fiber optic delay line module.

V. Polo et. al. (2003 PTL paper) and B. Vidal ECOC 2002 papers also suggest slight detuning of the multiple wavelengths, with wavelength gaps equal to the arrayed waveguide grating's free spectral range to fine tune their filter, but also point out that this fine tuning is highly limited (e.g., <3% of tuning range) to a very small wavelength shift (e.g., 50 GHz) as the AWG device's passband is practically limited.

What is needed is methods and systems for variable fiber optic delay lines that apply to any type of properly designed wavelength division multiplexing device and uses regular (non-dispersive) optical fiber for the long delays coupled with the wavelength division multiplexing devices and not the very long spools of dispersive fibers with the arrayed waveguide grating devices. In addition, the basic variable fiber optic delay lines of the present invention require wavelength division multiplexing device port specific bias delays for proper operations of the desired large time delay with the given high resolution signal production.

SUMMARY OF THE INVENTION

A primary objective of the present invention is to provide methods, systems, apparatus and devices for a new type of hybrid analog-digital control variable optical delay line.

A secondary objective of the present invention is to provide methods, systems, apparatus and devices for a variable optical delay line design that can realize these difficult delay line requirements.

A third objective of the present invention is to provide methods, systems, apparatus and devices for a hybrid design that uses optimized laser wavelength selection/tuning in combination with spatial dispersive elements (called WDM devices) coupled with optical fibers and temporally dispersive optical delay elements such as a chirped fiber Bragg grating to generate near continuous time delays over a long time delay range.

A fourth objective of the present invention is to provide methods, systems, apparatus and devices for a hybrid analog-digital control variable optical delay line wherein longer delays are obtained by selecting the WDM device physical fiber channels by specific wavelength selection.

A fifth objective of the present invention is to provide methods, systems, apparatus and devices for a hybrid analog-digital control variable optical delay line wherein shorter delays are selected by tuning the wavelength over a smaller wavelength range corresponding to the flat passband ranges of the WDM device channels. Short analog delays can also be obtained by other means such as freespace path length variation by motion of mirror or fiber lens optics. Variable attenuation in the proposed delay modules is also possible by wavelength tuning or fiber lens/mirror tilting.

A sixth objective of the present invention is to provide methods and systems for a hybrid near zero loss analog delay line using for example, an electronically controlled lens having a focal length that is varied to optimize fiber coupling as optical path length distance changes due to mirror/fiber lens motion.

A seventh objective of the present invention is to provide methods, systems, apparatus and devices for a hybrid analog delay line that combines wavelength tuning with transmissive Bragg grating optic and Lithrow configuration reflective blazed chirped grating optic. The reflective grating can also be tilted to various angles to change the delay steps per wavelength step for the laser tuned delay line.

An eighth objective of the present invention is to provide methods, systems, apparatus and devices for a hybrid optical delay line that uses laser tuning that can achieve very fast nanosecond speeds state-of-the-art electronically tuned lasers, thus enabling fast signal processing reconfiguration critical for aerospace and communications adaptive filtering operations.

A ninth objective of the present invention is to provide methods, systems, apparatus and devices for a hybrid optical delay lines can greatly impact applications such as phased array antenna phase and time delay beam forming controls, RF filtering in the optical domain for electronic warfare, communications, security, and radar applications, and also for antenna/radar testing applications.

A first embodiment provides a variable fiber optic delay line that includes an input circuit including an electro-optic modulator for receiving and modulating an input signal, a switchless discrete long time delay module including intrinsic variable attenuation coupled with the input circuit for injecting a first time delay into a modulated input signal to produce a first delayed output signal, and a switchless analog variable short delay module for receiving the first delayed output signal from the switchless discrete long time delay module and injecting a second time delay that is shorter than the first time delay to produce a delayed output signal having a delay approximately equal to the first time delay plus the second time delay. The module may also include non-dispersive single mode fibers for transmission between the input circuit, the discrete long delay module and the analog variable short time delay module and the input circuit in some embodiments a circulator coupled between the discrete long time delay module and the analog variable short delay module for routing the input signal to the discrete long time delay module and routing the first delayed output signal to the analog variable short delay module. The VFODL can be used for Radio Frequency (RF), digital electrical signals requiring time delay and amplitude processing or optical signal processing.

The discrete long delay module can include a wavelength division multiplexing device for multiplexing a modulated input signal into multiplexed signals and a movable reflective device for reflecting the multiplexed signals back to the wavelength division multiplexing device to inject the first time delay by using the free-space path change between the wavelength division multiplexing device and the movable reflective device for an adjustable first time delay and attenuation control. In this embodiment, the analog variable short delay module includes a movable fiber lens and a fixed fiber lens for providing a freespace delay for injecting a variable injected second time delay into the first time delayed output signal based on a distance between the movable and the fixed fiber lenses. The long and short time delay modules can include intrinsic variable attenuation.

The input device can also include a tunable lens coupled with the electro-optic modulator for wavelength tuning, the tunable lens tunable to one or more discrete wavelengths and the discrete long time delay module includes an arrayed waveguide grating wavelength division multiplexing device including a first and second looped fiber for receiving and modulating the modulated input signal from the electro-optic modulator and injecting the first time delay to produce the first delayed output signal. In this embodiment, the analog variable short delay module includes a circulator for routing the first delayed output signal and the returned delayed output signal, a fiber lens for receiving and focusing the first delayed output signal and a movable reflective device for receiving the focused first delayed output signal and returning the delayed output signal having the short time delay added to the first delayed output signal to produce the delayed output signal, the variable optical path length between the fiber lens and the reflective device determines a length of the short time delay.

The movable reflective device is an electro-optic crystal, an electric field applied to the electro-optic crystal providing an index change as the variable optical path and the VOFDL can include a programmable lens between fiber lens and the movable reflective device to produce both delay and optical attenuation, the programmable lens being programmed for a beam minimum waist located at a mirror position so the fiber lens and mirror form an approximately zero loss imaging system; and a distance between the programmable lens and the movable reflective device is an approximately half self image distance. The programmable lens can be set as a concave lens and a distance between the programmable lens and the reflective device is a combination of a free-space distance and a delay path distance or as a convex lens.

In another configuration, the discrete variable long delay module is a wavelength division multiplexing coupled fiber array delay line for flat-top passband type multiplexing of the modulated input signal, the connected fiber array having a predesigned bias delay for injecting the first time delay into the modulated input signal to produce the first delayed output signal. In this configuration, the analog variable short delay line includes a single dispersive fiber element to inject the short time delay into the first delayed output signal from the wavelength division multiplexing coupled fiber array delay line and a circulator connected between the wavelength division multiplexing coupled fiber array delay line and the single dispersive fiber element for routing the first delayed output signal to the single dispersive fiber element and routing the delayed output signal having the delay equal to approximately the first time delay and the second time delay. The single dispersive fiber element can be a chirped fiber Bragg grating to cover a full spectral usage of the wavelength division multiplexing coupled fiber array delay line.

Alternatively, the discrete long delay module includes a first wavelength division multiplexing device for receiving and multiplexing the modulated input signal, a discrete fiber delay connected with each output channel of the first wavelength division multiplexing device and a second wavelength division multiplexing device connected to an opposite end of the discrete fiber delay for demultiplexing the first delayed output signals into a multiplexed first delayed output signal. For this configuration, the analog variable short delay module is a dispersion time delay optic device for injecting a short time delay into the multiplexed delayed output signal to inject the second time delay to produce the delayed output signal, the discrete long delay module and analog variable short delay module forming a transmissive configuration with intrinsic variable optical attenuation using flat-top passband wave divisional multiplexing.

The discrete long delay module includes a wavelength division multiplexing device for receiving and multiplexing the modulated input signal and a fiber mirror connected to each output channel of the wavelength division multiplexing device via a transmission medium for injecting the first time delay into each multiplexed output signal and returning the delayed multiplexed output signal to the wavelength division multiplexing device in another embodiment.

This configuration includes an analog variable short delay module having a wavelength dispersion fiber for receiving the first delayed output signal from the wavelength division multiplexing device and injecting the second time delay to produce the delayed output signal. The discrete long delay module and analog variable short delay module form a Gaussian passband wavelength division multiplexing device. The circuit can includes an optical amplifier following the wavelength dispersion fiber for amplifying the delayed output signal to compensate for an optical loss from detuning of the wavelength division multiplexing device and a spectral filter following the optical amplifier to cancel spectral loss or gain variations regardless of a selected wavelength of the wavelength division multiplexing device.

The input circuit in the next configuration includes a circulator for receiving and routing the input signal and a fiber lens between the circulator and the discrete long delay module. The discrete long delay module includes a transmission volume Bragg grating and a transmissive dispersion prism, a Lithrow configuration blazed reflection grating with wavelength tuning to a selected delay and a spherical lens after the transmission volume Bragg grating to convert an angular displacement of a tunable wavelength into a parallel beam format to is aligned with the reflection grating for Lithrow configuration diffraction reflecting an incident back from the reflection grating along the same path through the spherical lens and transmission volume Bragg grating and fiber lens.

Further objects and advantages of this invention will be apparent from the following detailed description of preferred embodiments which are illustrated schematically in the accompanying drawings.

BRIEF DESCRIPTION OF THE DRAWINGS

FIG. 4d is a schematic diagram showing an alternative configuration of the analog optical delay using programmable lens and motion to produce delay and variable optical attenuator shown in FIG. 4a.

FIG. 5b shows the flat-top waveform produced by smart wavelength tuning and flat-top type wavelength division multiplexing device shown in FIG. 5a.

FIG. 6b shows the waveform generated by the variable fiber optic delay line shown in FIG. 6a.

DESCRIPTION OF THE PREFERRED EMBODIMENTS

Figure 1:
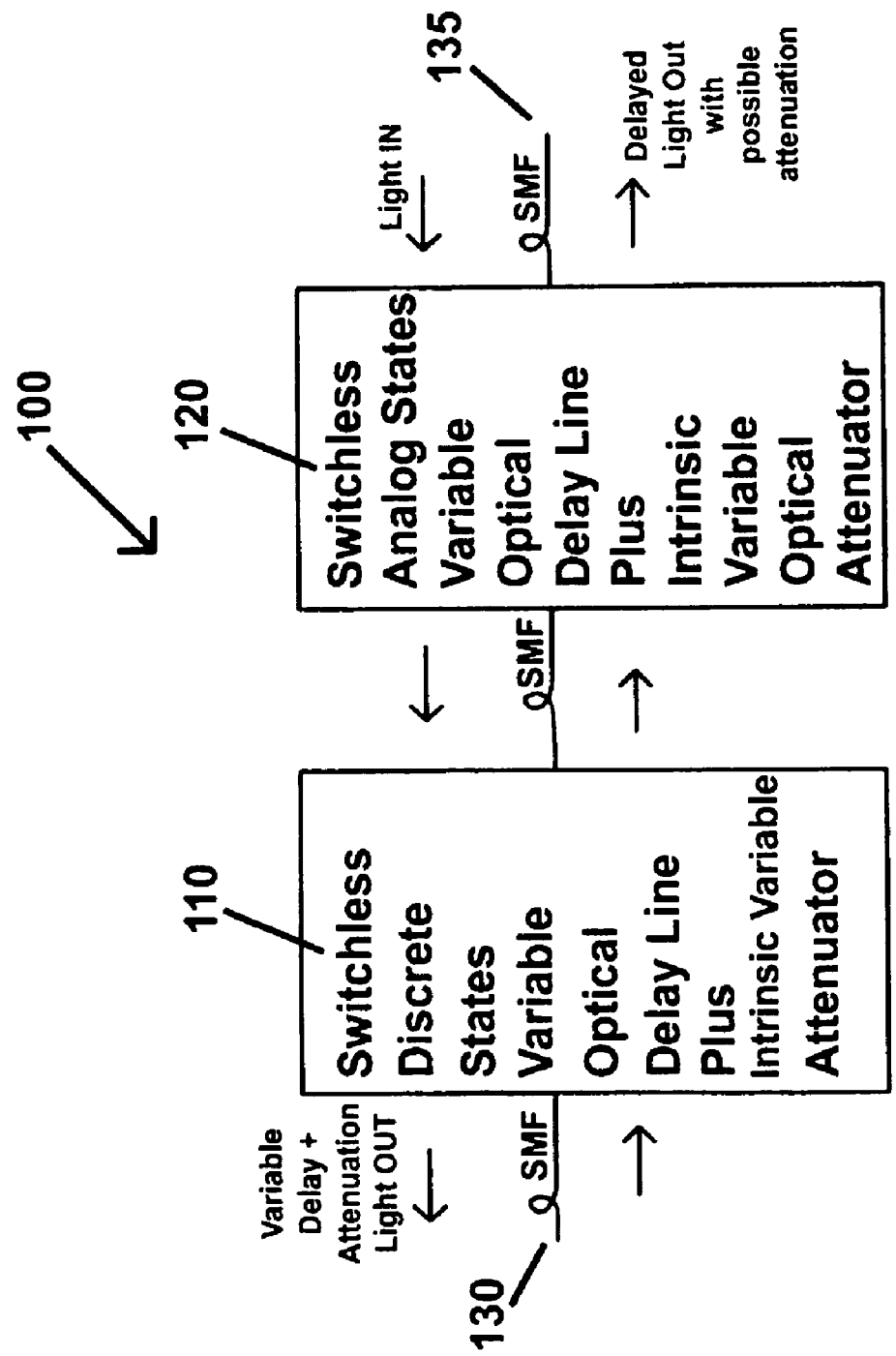
FIG. 1 is a schematic block diagram showing a switchless hybrid variable optical delay line and variable intrinsic optical attenuator fundamental design paradigm for enabling electrical and all-optical signal processing.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | variable fiber optic delay line |
| 110 | discrete delay structure |
| 120 | analog delay structure |
| 130 | input port |
| 135 | output port |
| 200 | D/A VODL |
| 205 | tunable laser |
| 210 | electro-optic modulator |
| 215 | single mode fiber |
| 220 | optical circulator |
| 230 | wave division multiplexing device |
| 240 | fiber lens |
| 245 | fiber lens |
| 260 | fiber mirrors |
| 280 | photo-detector |
| 300 | discrete state delay line & VOA |
| 305 | tunable lens |
| 310 | electro-optic modulator |
| 320 | circulator |
| 340 | fiber lens |
| 360 | mirror |
| 370 | looped fiber delay |
| 375 | looped fiber delay |
| 380 | photo detector |
| 400 | analog optical delay |

| | |
|---|---|
| 420 | circulator |
| 430 | programmable lens |
| 435 | programmable lens |
| 440 | fiber lens |
| 445 | fiber lens |
| 460 | mirror |
| 500 | hybrid A/D VODL |
| 505 | tunable lens |
| 510 | electro-optic modulator |
| 520 | circulator |
| 525 | circulator |
| 530 | wavelength division multiplexer |
| 535 | delay fiber array |
| 570 | analog delay module |
| 575 | chirped fiber Bragg gratings |
| 600 | transmissive hybrid A/D VODL |
| 605 | tunable lens |
| 610 | electro-optic modulator |
| 630 | wavelength division multiplexer |
| 635 | wavelength division de-multiplexer |
| 670 | analog delay |
| 680 | photo diode |
| 700 | VODL |
| 705 | tunable lens |
| 710 | electro-optic modulator |
| 720 | circulator |
| 730 | wavelength division multiplexer |
| 760 | mirror |
| 770 | analog delay module |
| 775 | spectral filter |
| 780 | photo diode |
| 790 | optical amplifier |
| 800 | analog VODL |
| 805 | fiber lens |
| 820 | circulator |
| 860 | lens |
| 875 | grating |
| 890 | reflector |
| 895 | linear wavelength spread |

The present invention describes and illustrates variable fiber optic delay line VFODL designs that apply to any type of properly designed wavelength division multiplexing WDM device, including arrayed waveguide grating devices. Also, the preferred embodiment variable fiber optic delay line designs uses regular (non-dispersive) optical fiber for the long delays coupled with the wavelength division multiplexing devices and not the very long spools of dispersive fibers with the arrayed waveguide grating devices. In addition, the basic variable fiber optic delay lines require wavelength division multiplexing device port specific bias delays for proper operations of the desired large time delay with the given high resolution signal production.

The methods, systems, apparatus and devices of the present invention provides variable fiber optic delay line designs that solve prior art that relied on slight detuning of the multiple wavelengths with wavelength gaps equal to the arrayed waveguide gratings free spectral range to fine tune their filter that limited (e.g., <3% of tuning range) fine tuning to a very small wavelength shift (e.g., 50 GHz) as the arrayed waveguide grating device's passband is practically limited. The variable fiber optic delay line configuration of the present invention require wavelength division multiplexing device port specific bias delays for proper operations of the desired large time delay with the given high resolution signal production.

N. A. Riza, et. al, "Analog-Digital Variable Fiber-Optic Delay Line," IEEE/OSA Journal of Lightwave Technology (JLT), vol. 22, No. 2, pp. 619-624, February 2004 describes a prior art variable fiber optic delay line that solves the previous resolution-range dilemma. This prior art hybrid analog-digital delay line design uses optical switches to implement the digital part of the delay line for long delays and an analog wavelength sensitive method to produce the shorter analog-mode delay. Because optical switches are used in the digital part of the module, the overall delay line can accumulate high loss and today's fast ns-type optical switches also have poor interchannel crosstalk (e.g., 20 dB).

The methods and systems of the present invention solve this problem with a fast programming variable fiber optic delay line design that does not depend on the high loss, poor crosstalk, and fast optical switches. In addition, the present invention provides two new analog-mode variable optical delay lines.

The first analog-mode variable optical delay line uses freespace path length change by mirror motion and optimal low loss beam design and single mode fiber coupling via an externally actuated lens (e.g., liquid lens) to realize a continuous variation delay and signal attenuation control. Previously, motion-based freespace delays have been demonstrated, but these modules were restricted to very short delays and had optical loss variations that increase greatly with longer time delay requirements. The actuated lens-based delay/attenuation module of the present invention solves all these prior art problems and limitations.

The second embodiment analog delay module is a grating-based VFODL that can operate at very fast nanosecond-type speeds. Previously, gratings have been deployed to get static/fixed optical delays for an RF optical filter application; or variable optical delays for broadband optical pulse delay using mechanical mirror rotation/tilting; or an acousto-optic deflector or for CW light optical delay as in Optical Coherence Tomography (OCT) applications. None of these variable optical delay lines provide super-high speed nano-second time delay reset times, particularly for moderately long time delays such as are needed in RF signal processing of radar signals. Unlike the prior art, the grating-based variable fiber optic delay line design of the present invention shown in FIG. 5a has no-moving parts and can provide this super fast continuous delay.

FIG. 1 is a schematic block diagram showing a switchless hybrid variable optical delay line and variable intrinsic optical attenuator fundamental configuration 100 for enabling electrical, RF or digital and all-optical signal processing. A preferred embodiment of switchless variable fiber optic delay line combines a discrete delay structure having independent physical fiber path selection for long delays with an analog delay line for short delays equal for example to the long delay module resolution to form the desired fast low loss high resolution long time delay VFODL. The variable optical delay line also intrinsically contains a variable optical attenuator for attenuation control. As shown by the arrows in FIG. 1, the signal flow the basic structure can be designed to be reversible if needed. In the preferred embodiment, the input and output ports have classic single mode fibers although alternative transmission medium may be substitutes.

Figure 2:
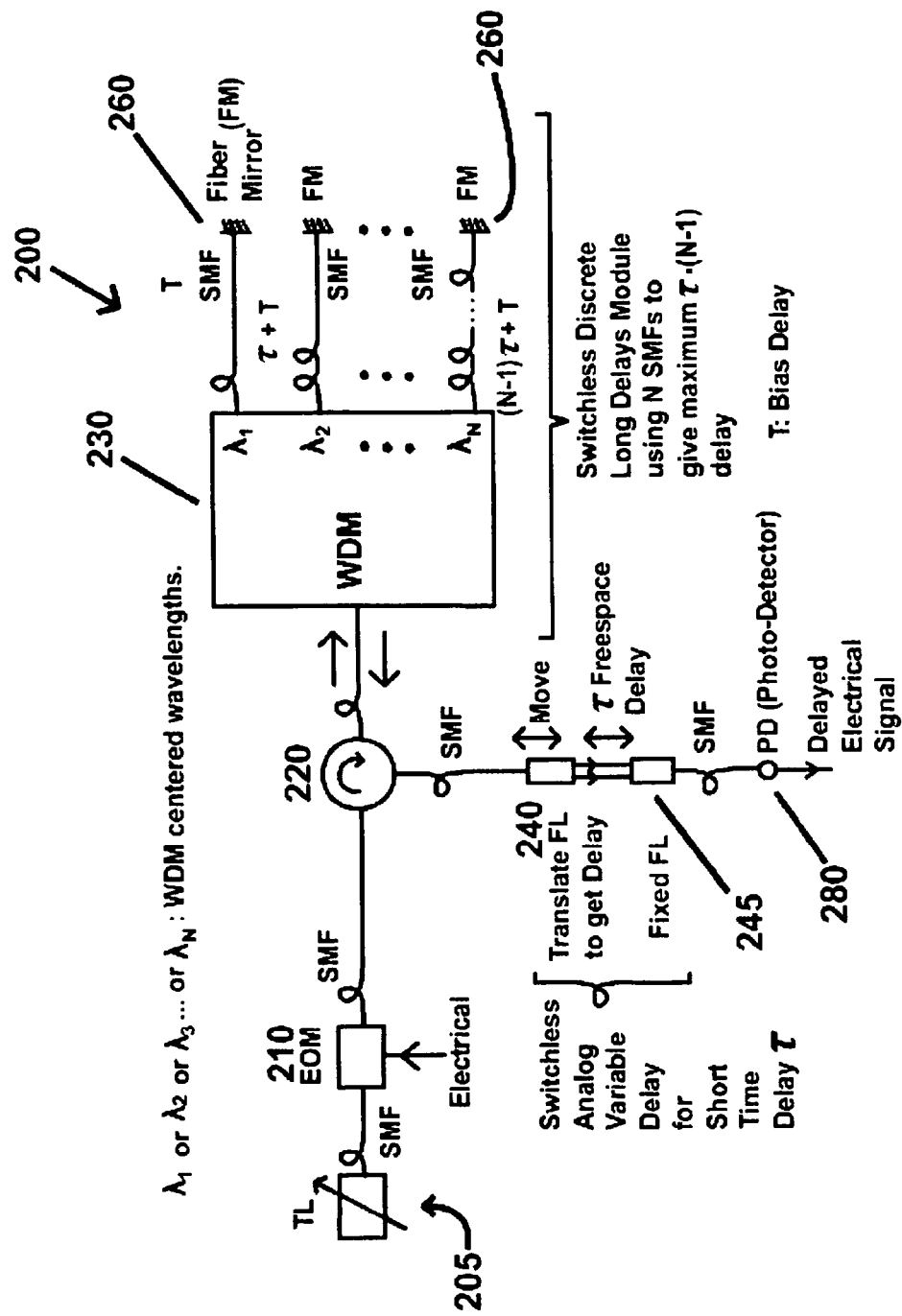
FIG. 2 is a schematic diagram showing an example of a switchless hybrid digital-analog variable optical attenuator design using wavelength switching and mechanical motion with 1×N wave division multiplexing device.

FIG. 2 is a schematic showing an example of a switchless hybrid digital-analog VODL 200 design using wavelength tuning via the tunable laser 205 that can be set to N discrete wavelengths given by $\lambda_1, \lambda_2, \ldots \lambda_N$. In the configuration shown, light from the tunable laser 205 is electrically modulated using the electro-optic modulator 210. The modulated light then passes via a single mode fiber 215 and a 3-port optical circulator 220 to enter the N channel wavelength division multiplexing device 230. The wavelength division multiplexing device 230 can be of any technology such as fiber Bragg gratings, thin-film filters, freespace coupled bulk gratings, photonic crystal prisms or arrayed waveguide gratings.

Those skilled in the art will understand that alternative wavelength division multiplexing devices can be substituted without departing from the scope of the present invention. Each fiber channel output port of the wavelength division multiplexer 230 is connected to a single mode fiber for a bias delay T and the nth port specific optical time delay $(n-1)\tau$, where $n=1, 2, 3, \ldots N$. The single mode fibers are terminated with fiber mirrors 260 that reflect the light back through the WDM device to the analog delay line in the module. All transmission fibers used in the design are regular single mode fibers unless identified as an alternative medium.

As shown in FIG. 2, the analog variable fiber optic delay line is formed by changing the freespace optical path between the two fiber lenses 240 and 245. Moving one fiber lens results in a small analog-mode delay over a designed range of $\tau$ that corresponds to the delay resolution of the discrete state wavelength division multiplexer-based fiber delay line. The delayed light is detected by a high speed photo-detector 280 to produce a delayed electrical signal. By simply tuning the laser 205 to discrete wavelength positions matching the wavelength division multiplexer 230 channels and moving the fiber lens 240 or 245, a host of time delays can be generated with high resolution over a wide time delay range of $(N-1)\tau$. Additionally, slight detuning of the wavelength off the classic Gaussian passband type WDM device central optimized wavelengths can produce an intrinsic variable optical attenuation effect, thus providing controlled analog-mode electrical attenuation for the input electrical signal.

Figure 3:
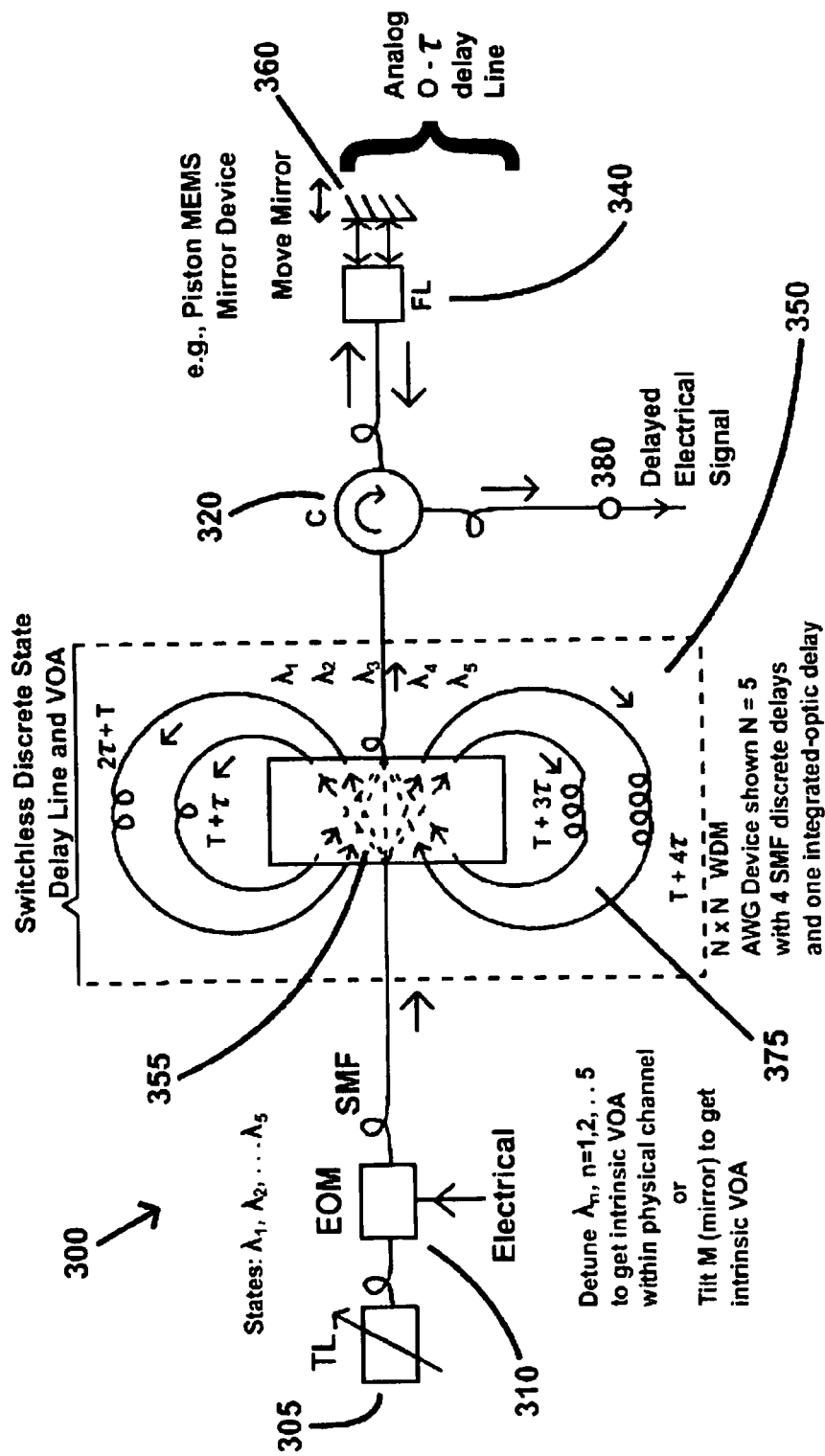
FIG. 3 is a schematic diagram showing another example of switchless hybrid delay line and variable optical attenuator using N×N arrayed waveguide grating wavelength division multiplexing device and mirror motion analog delay.

FIG. 3 is a schematic showing another example of a switchless hybrid delay line and a variable optical attenuator 350. In this example, the variable fiber optic delay line 300 configuration uses a classic N×N (e.g., N=5) arrayed waveguide grating 355 wavelength-division multiplexing device 350 to get the long delays of $4\tau$ and mirror 360 piston motion to get the short analog delays within zero to i delay setting. The straight path light in the arrayed waveguide grating 355 forms the reference delay T compared to the looped fiber delays 370 and 375. As shown, the looped fiber at the $\lambda_1$ ports gives $T\pm\tau$ delay, the looped fiber at the $\lambda_2$ ports gives $T+2\tau$ delay, the looped fiber at the $\lambda_4$ ports gives $T+3\tau$ delay, and the looped fiber at the $\lambda_5$ ports gives $T+4\tau$ delay. The fibers used in the design are regular single mode fibers. The moving mirror 360 can be a piston MEMS micro mirror for fast motion. In an embodiment, the mirror 360 is fixed and an electro-optic crystal whose index changes with an applied electric field is used so optical path length changes and hence optical delay changes with a fast reset time. As described in regard to FIG. 2, the variable optical attenuator operations can be achieved via wavelength detuning to cause coupling loss in the wavelength-division multiplexing device.

FIG. 4 is another schematic diagram showing an analog optical delay line 400 using a programmable lens 430 and motion of mirror 460 to produce both delay and a variable optical attenuation. The key feature of this analog delay line 400 is that the optical loss in the module can be essentially zero assuming lossless programmable lens 430, fiber lens 445, and mirror 460, even when the mirror 460 is moved to change the delay. Note that the to programmable lens 430 is programmed to make sure the beam minimum waist is always located at the mirror position so the fiber lens 445 and mirror 460 form a zero loss imaging system with the single mode fiber for optimal coupling. The programmable lens 430 can be programmed to violate this condition to induce a loss and the delay also comes with an attenuation; hence variable optical attenuation operation.

Figure 4A:
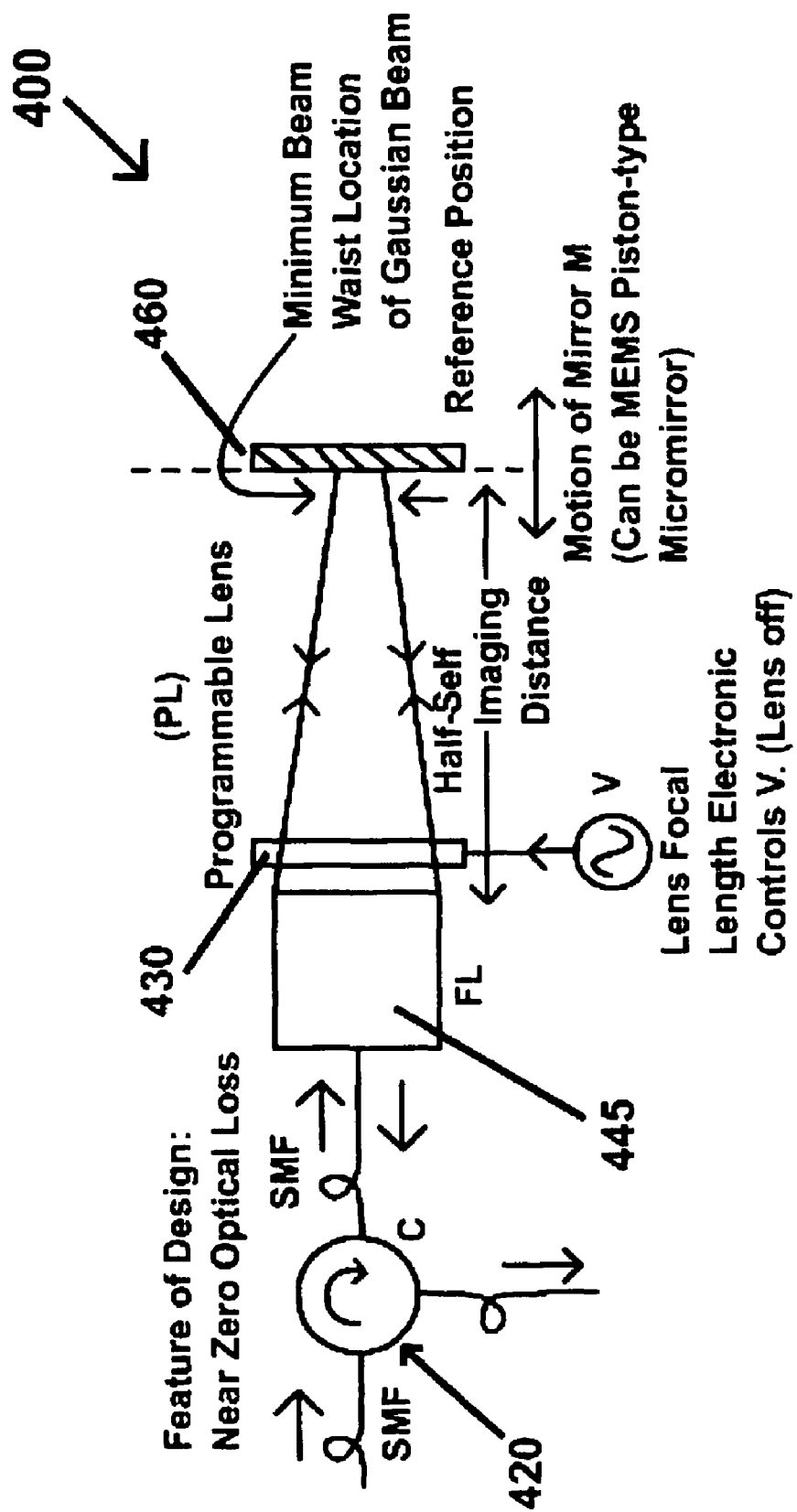
FIG. 4a is a schematic diagram showing an analog optical delay using programmable lens and motion to produce delay and variable optical attenuator.
Figure 4B:
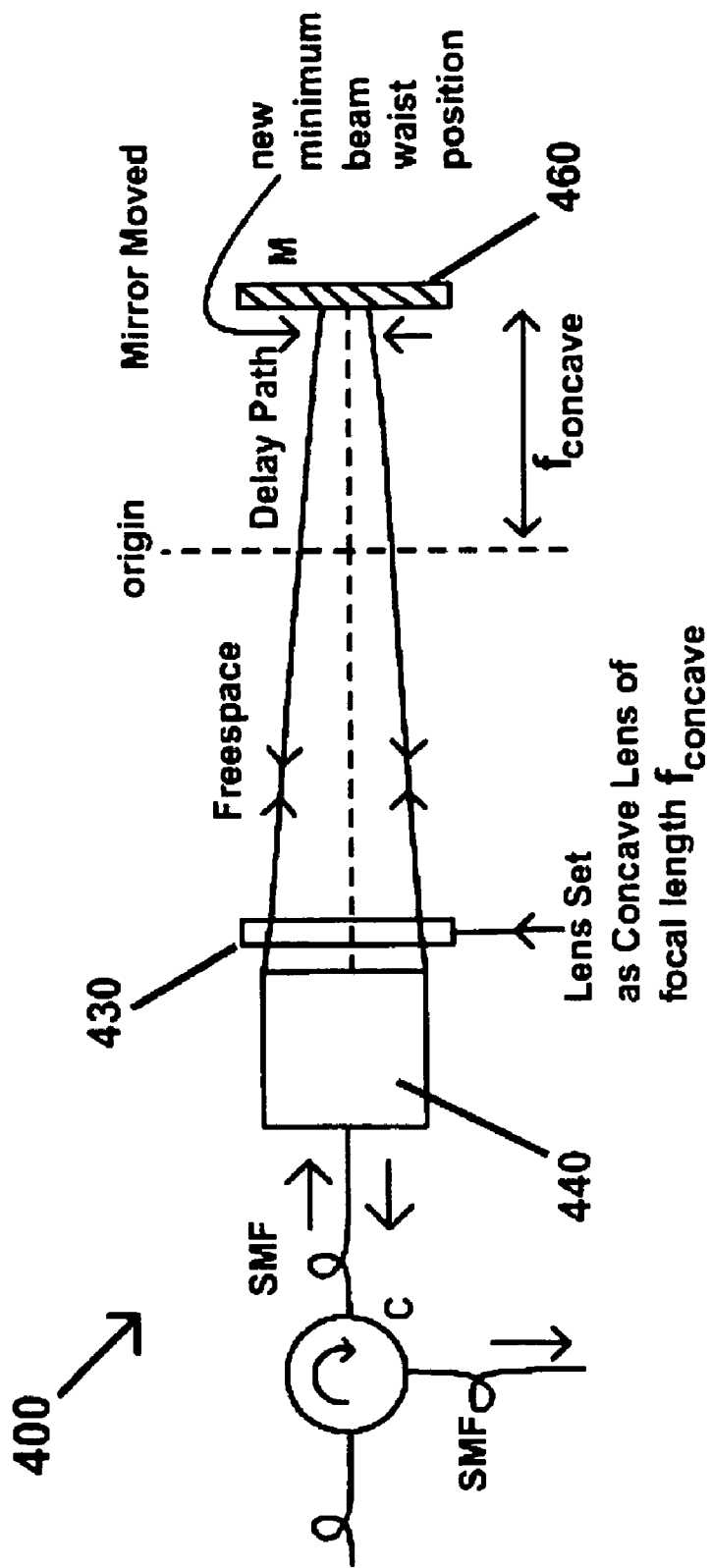
FIG. 4b is another schematic diagram showing the analog optical delay using programmable lens and motion to produce delay and variable optical attenuator.
Figure 4C:
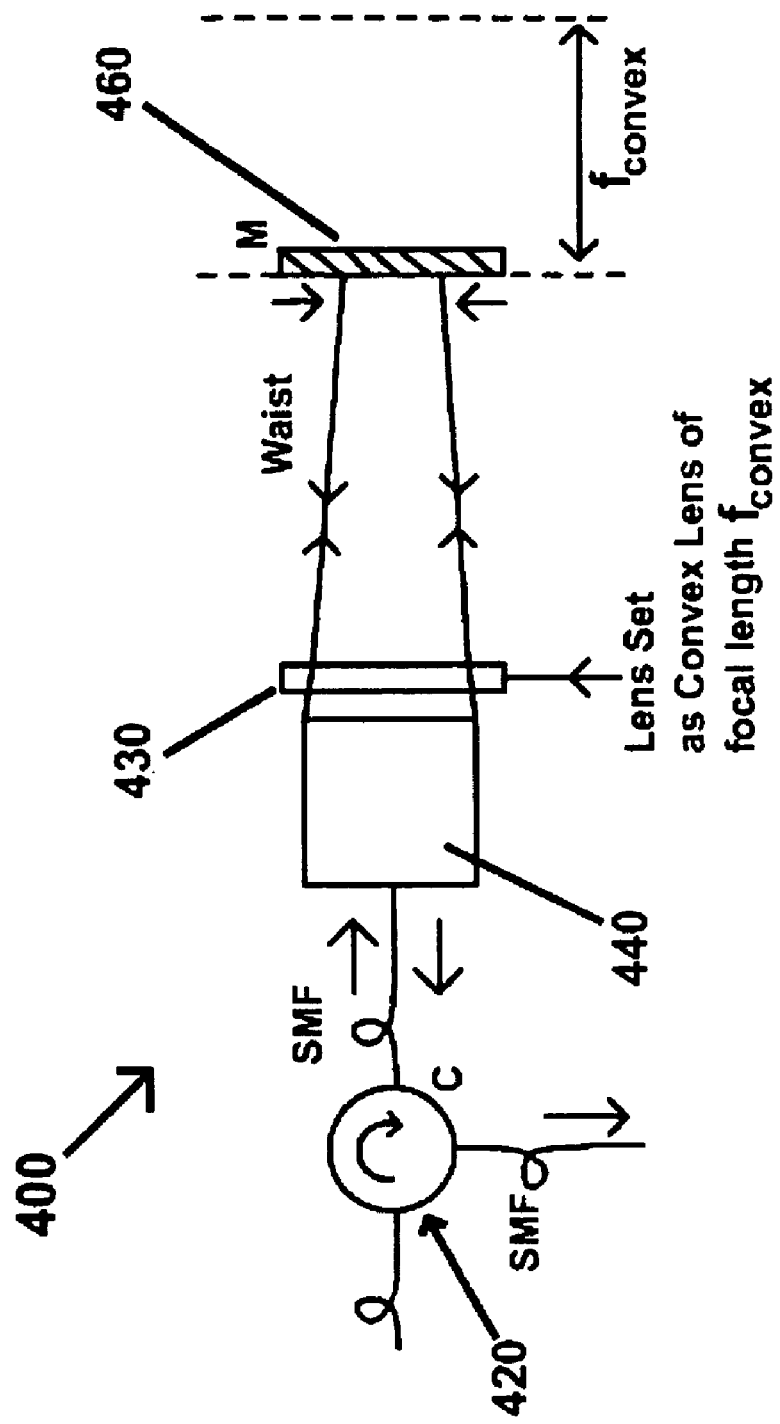
FIG. 4c is yet another a schematic diagram showing another example an analog optical delay using programmable lens and motion to produce delay and variable optical attenuator.
Figure 4D:
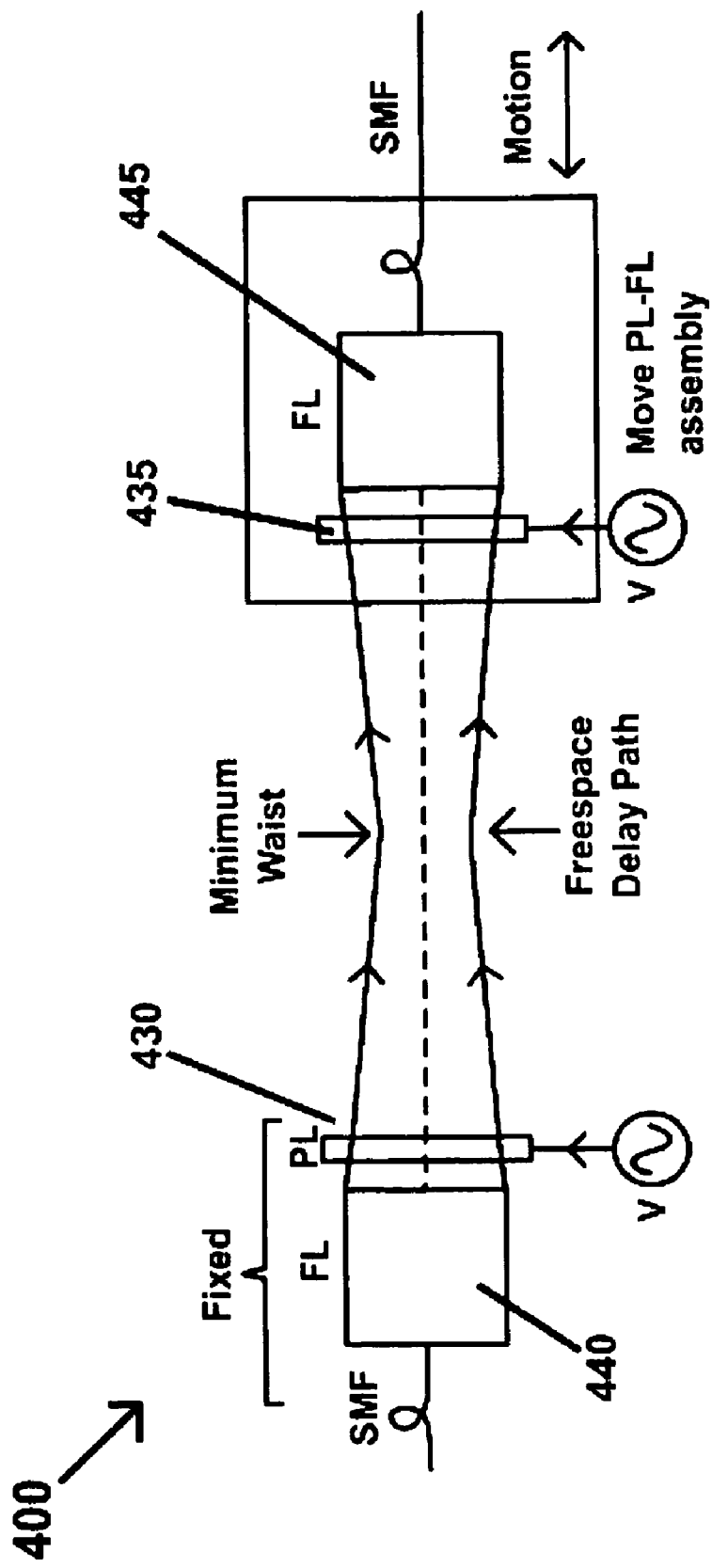

FIGS. 4a, 4b and 4c show how the reflective design operates while FIG. 4d shows a typical transmissive design where the whole programmable lens 430, fiber lens 445 and single mode fiber assembly translates to cause optical delay. FIG. 4a show the variable optical delay line 400 with a distance between the programmable lens 430 and mirror 460 having an approximately half self imaging distance. FIG. 4b show the variable optical delay line 400 with a distance between the programmable lens 430 and mirror 460 having combination free-space distance and a delay path distance. As shown in FIG. 4b, the programmable lens 430 is set as a concave lens having a focal length of $f_{concave}$. In this embodiment, the mirror 460 position is a new beam waist position. FIG. 4c show the variable optical delay line 400 with a shortened distance between the programmable lens 430 and mirror 460, wherein the programmable lens 430 is convex and has a focal length $f_{convex}$. FIG. 4d shows a typical transmissive design where the whole programmable lens 430, fiber lens 440 and single mode fiber assembly translates to cause fixed optical delay.

In this embodiment, there is a freespace delay path between the left programmable lens and the right programmable lens 435 wherein the right programmable lens 435 and fiber lens 440 combination is movable for changing the length of the delay path. The programmable lens can be any actuated variable focal length lens such as an electronically, mechanically or optically actuated spherical lens such as a liquid lens, a liquid crystal lens, or a MEMS lens if the delay line is designed in reflective geometry.

Figure 5A:
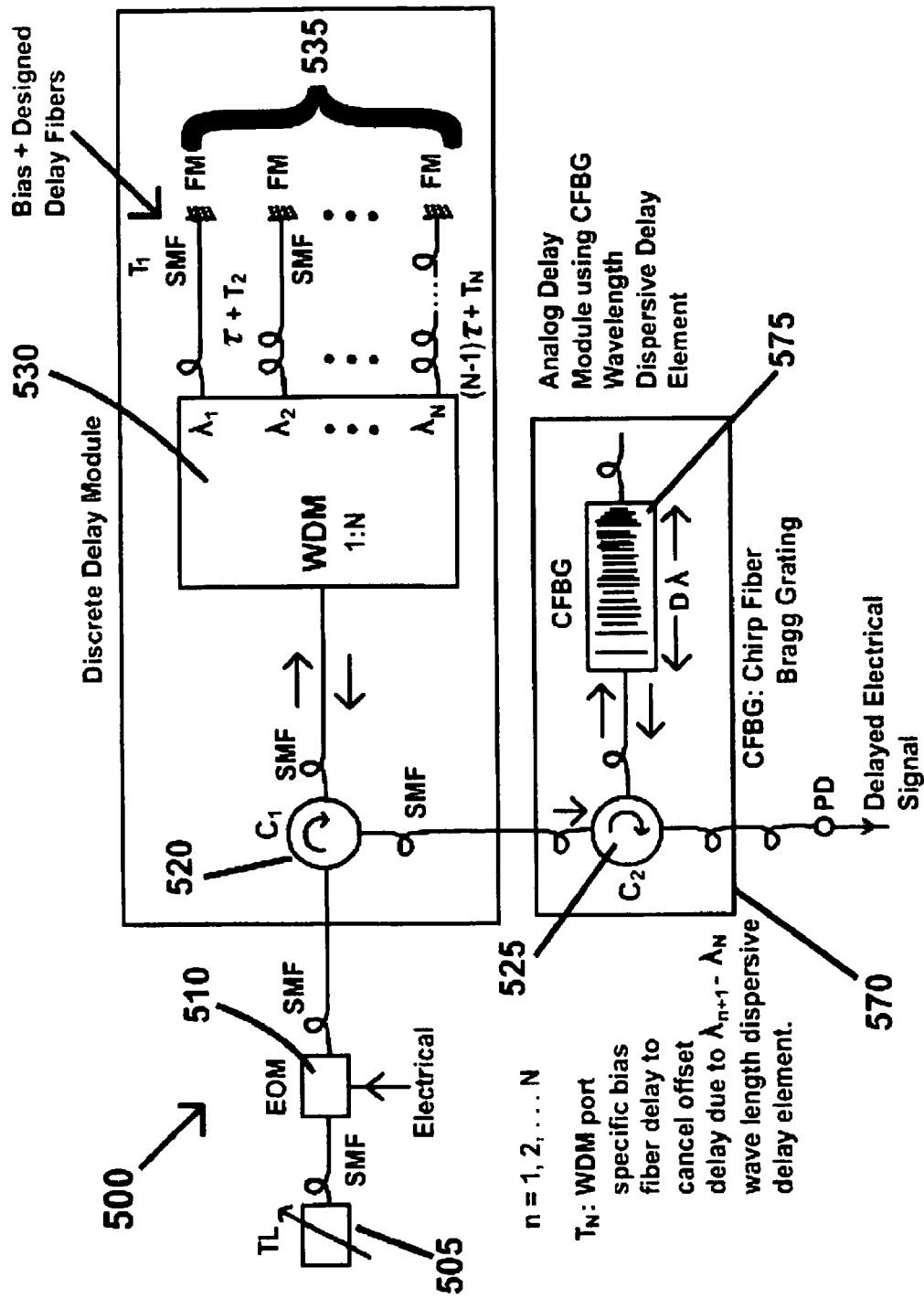
FIG. 5a is a schematic diagram showing a switchless hybrid analog-digital variable optical delay line and variable optical attenuator using smart wavelength tuning and flat-top type wavelength division multiplexing devices according to an embodiment of the invention.

The schematic diagram shown in FIG. 5a is yet another example of a switchless hybrid analog-digital variable optical delay line and variable optical attenuator 500 using smart wavelength tuning and flat-top passband type wavelength-division multiplexing devices 530. For example, see Photeon, Inc., Bregenz, Austria, data sheet for 200 GHz 8-channel flat-top DWDM MUX/DEMUX, 2008. The configuration shown in FIG. 5 can operate at extremely fast nanoseconds speed because it contains no moving parts.

Figure 5B:
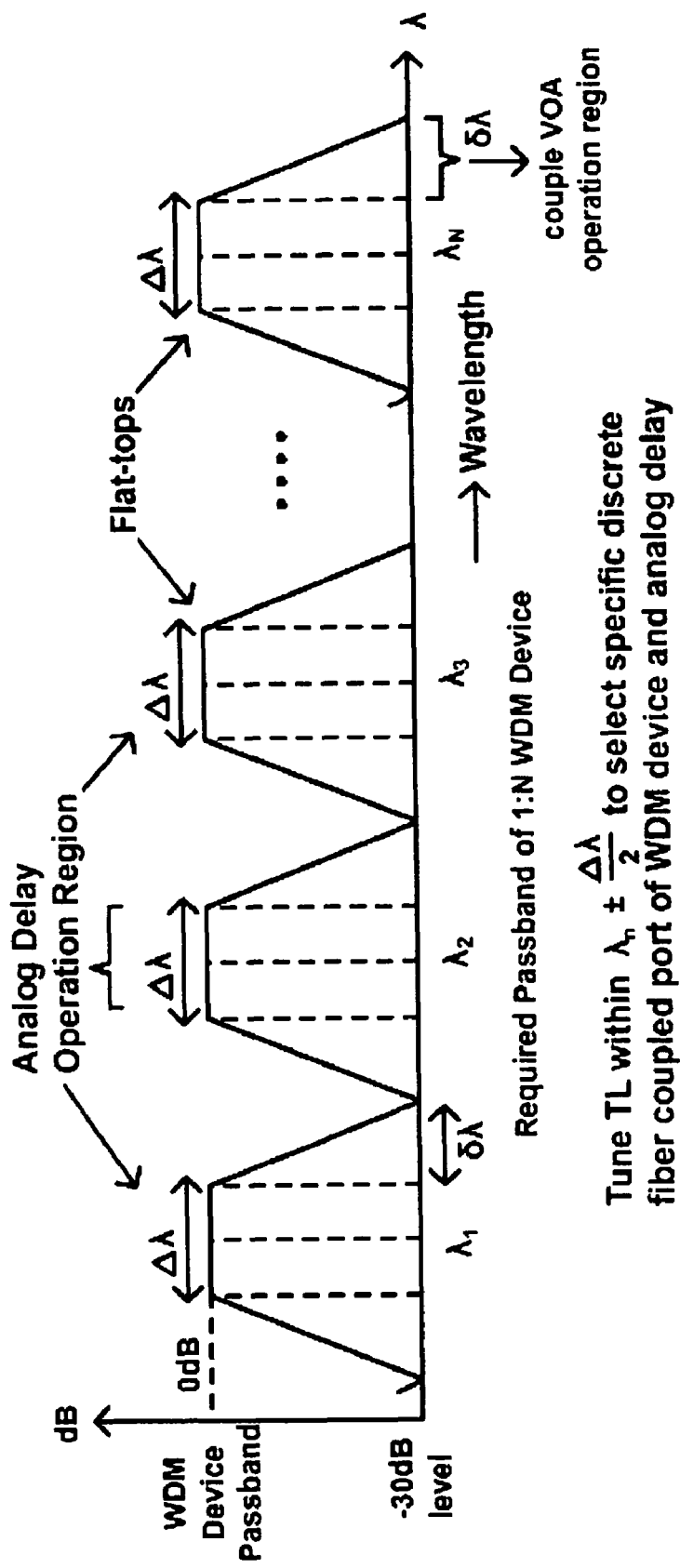

The wavelength-division multiplexing device 530 coupled fiber array delay line 535 provides the discrete state long time delay settings of $T_1$, $T_2+\tau$, $T_3+2\tau$, ..., $T_N+(N-1)\tau$ for wavelengths set to $\lambda_1 \pm 0.5\Delta\lambda$, $\lambda_2 \pm 0.5\Delta\lambda$, $\lambda_3 \pm 0.5\Delta\lambda$, ..., $\lambda_N \pm 0.5\Delta\lambda$, respectively. The wavelength-division multiplexer 530 is designed to have $\Delta\lambda$ flat-top passbands as shown in FIG. 5b to tune the laser by $\pm 0.5\Delta\lambda$ around any one of the N central wavelengths (i.e., $\lambda_1, \lambda_2, \lambda_3, \ldots, \lambda_N$) and still have full optical coupling into the fibers 535 connected to the wavelength-division multiplexer 530. This tuning around central wavelengths provides an analog mechanism 570 to generate the required shorter time delay $\tau$ by passing the light through a single highly dispersive fiber element such as the chirped fiber Bragg grating 575 shown in FIG. 5. In this example, the chirped fiber Bragg grating 575 must have a chirped bandwidth $D\lambda$ of at least $(\lambda_N-\lambda_1)+\Delta\lambda$ to cover the full spectral usage of the wavelength divisional multiplexer 530. Note the WDM connected fiber array 535 contains certain predesigned bias delays $T_1$, $T_2$, $T_3$, ..., $T_N$, that correspond to delay amounts used to offset relative delays caused by the chosen central wavelength difference parameter $(\lambda_n - \lambda_1)$ caused delays in the chirped fiber Bragg gratings 575, with n=1, 2, 3, ... N.

For example, bias delay for the nth wavelength division multiplexing port could be $T_n = T+(n-1)\Delta t$, where $\Delta t$ is the chirped fiber Bragg gratings 575 delay caused by the consecutive interchannel wavelength difference of $(\lambda_{n+1}-\lambda_n)$. In other words, regardless of n+1 the wavelength division multiplexing-based long time delay selected using a specific wavelength passband of the wavelength division multiplexing device 530, the analog delay line 570 should only provide an additional zero to $\tau$ delay produced by the $\Delta\lambda$ tuning within the analog-mode fiber dispersive element 575, e.g., CFBG in FIG. 5a.

As a result, smart tuning of the laser provides both long time delays from the descrete delay module and high precision delays from the analog delay module 570, all at very fast laser wavelength reset speeds. Depending on the designed optics for this variable fiber optic delay line module 500, true-time delay beamforming for an RF antenna array can be produced or true-time plus modulo-$2\pi$ phase delay can be produced. Because modulo-$2\pi$ phase delay corresponds to a RF wavelength distance delay or integer multiples of the wavelength distance delay, one only uses a very small time delay of one RF wavelength distance to cover the full zero to $2\pi$ RF phase range required for phase-based beamsteering controls, for example, within an array sub-aperture with time delay steering used across the apertures. Note that one is also able to exploit the WDM passband edge (steep slope) about a $\delta\lambda$ range to enable a variable optical attenuation operation, although this would be coupled with a specific delay value. A simpler approach is to control the power of the tunable lens 505 coupled with the electro-optic modulator 510. The tunable lens 505 can be tuned within $\lambda n \pm (\Delta\lambda)/2$ to select specific discrete fiber coupled port of the wavelength division multiplexing device 530 and analog delay module 570.

Figure 6A:
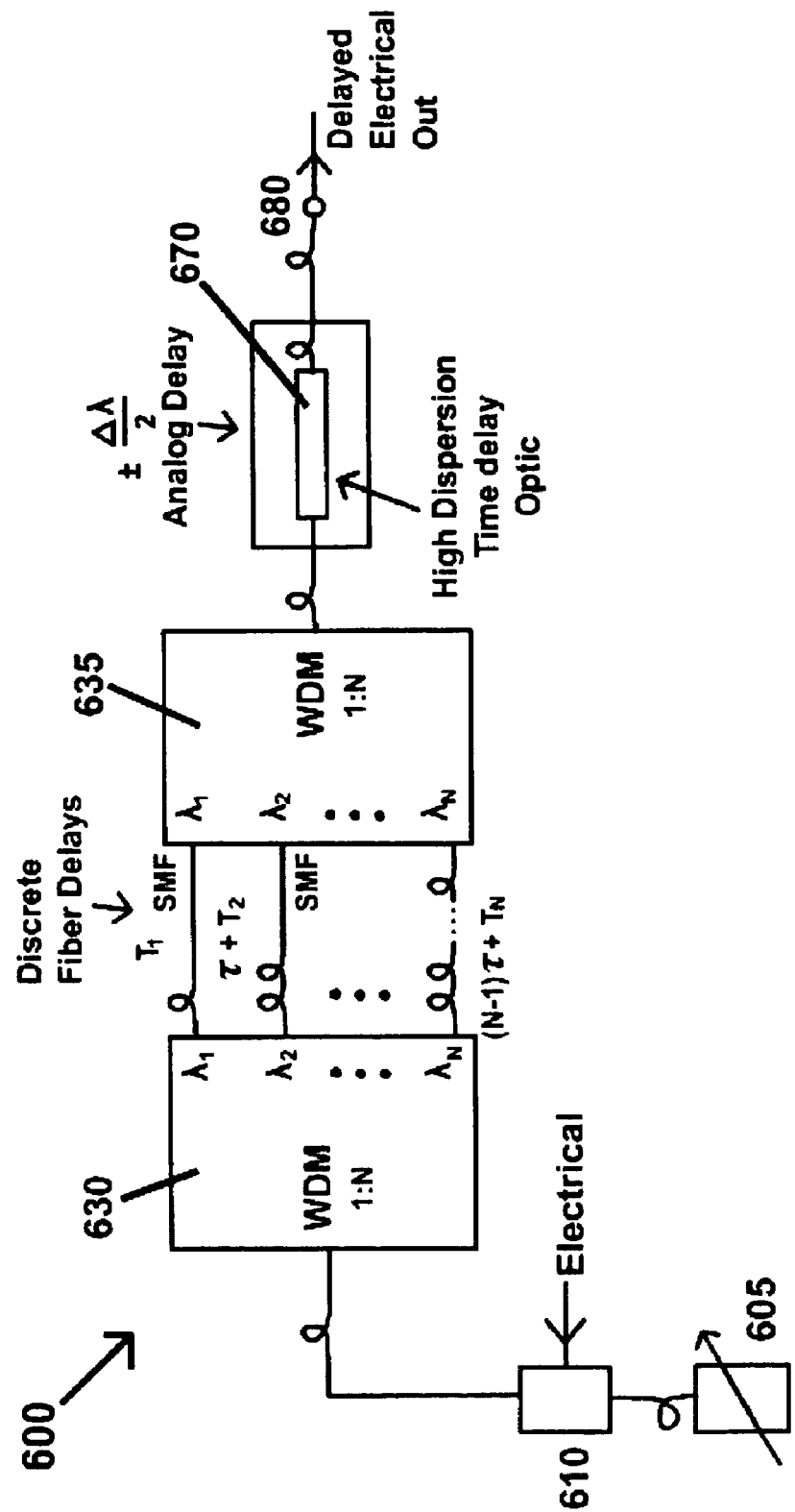
FIG. 6a is a schematic diagram showing a transmissive design hybrid analog-digital variable optical delay line design with intrinsic variable optical attenuator using flat-top passband wavelength division multiplexing devices and smart wavelength tuning.
Figure 6B:
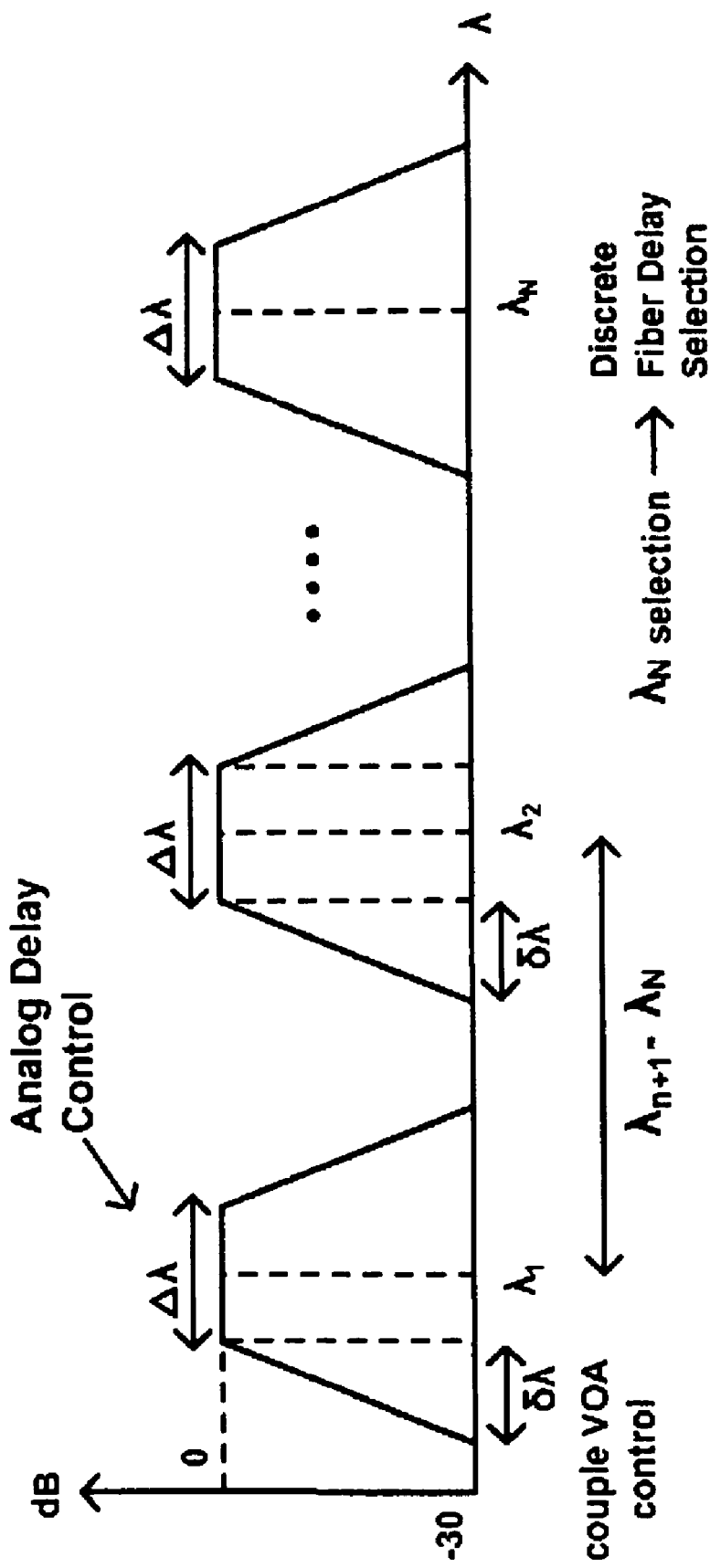

A transmissive design hybrid analog-digital variable optical delay line 600 configuration is shown schematically in FIG. 6a with intrinsic variable optical attenuator using two flat-top passband wave divisional multiplexing devices 630 and 635 and smart wavelength tuning. In this design compared to FIG. 5, a transmissive high dispersion fiber-optic 670 is used as an analog delay module to provide the analog delay of $\pm \Delta\lambda/2$ via the $\Delta\lambda$ tuning about a chosen central WDM wavelength to produce the delayed electrical output shown in FIG. 6b. This transmissive high dispersion fiber-optic can be a single mode fiber dispersion shifted fiber or a specialty photonic crystal fiber (PCF). As with the variable optical time delay module shown in FIG. 5a, the tunable lens 605 is tuned to select a specific discrete fiber coupled port of the wavelength division multiplexing device 630.

Figure 7A:
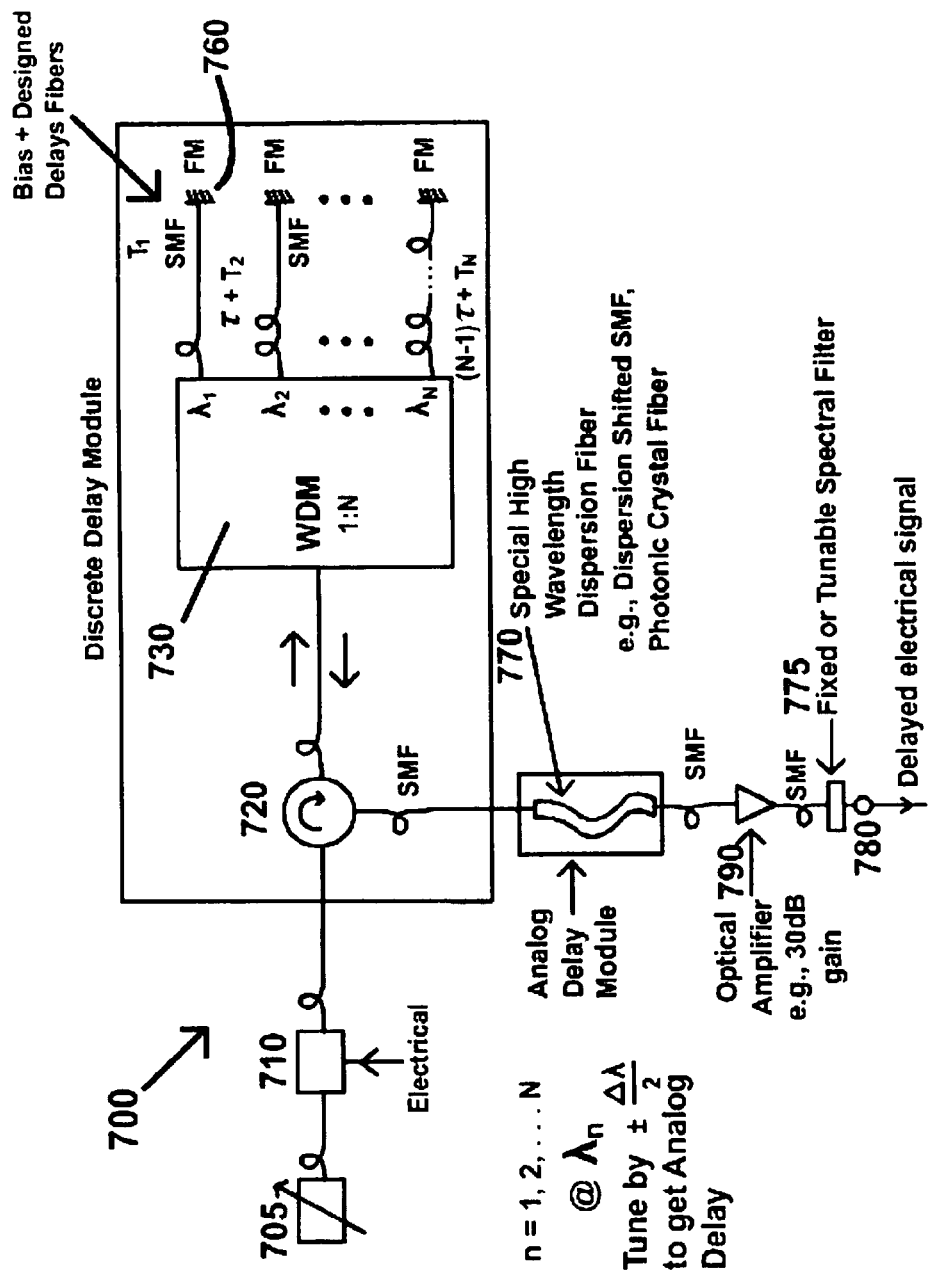
FIG. 7a is a schematic diagram showing a switchless hybrid analog-digital variable optical delay line with classic passband wavelength division multiplexing device and smart wavelength selection.
Figure 7B:
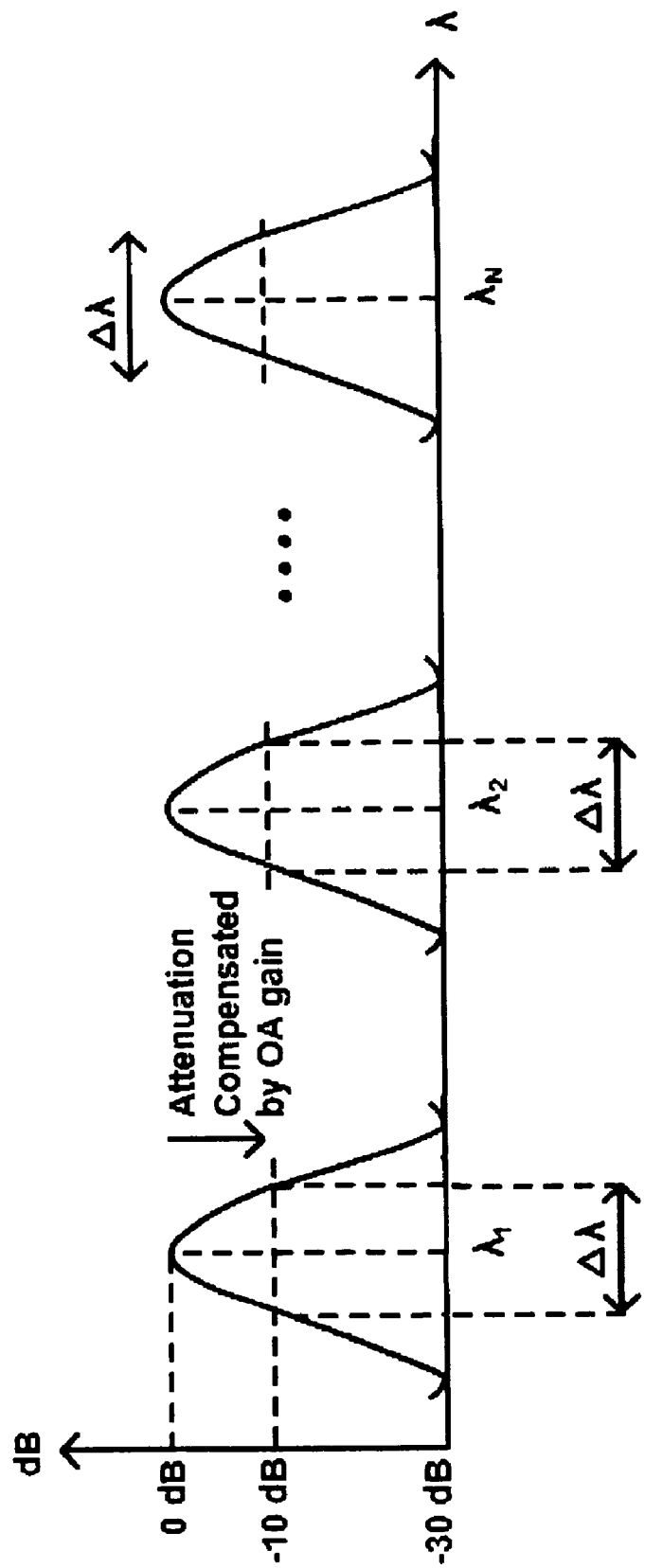
FIG. 7b shows the waveform generated by the variable fiber optic delay line shown in FIG. 7a with attenuation compensated by optical attenuator gain.

The switchless hybrid analog-digital variable optical delay line 700 shown schematically in FIG. 7a includes a classic Gaussian passband WDM device 730 and smart wavelength selection. In this case, detuning from the wavelength division multiplexer 730 central wavelengths produces coupling loss, say 10 dB loss for a $\Delta\lambda$ detune. Hence, an optical amplifier 790 is used to compensate this optical loss by providing a gain, but more importantly, a specific fixed or tunable spectral filter 775 is introduced into the system following the analog delay module 770 to cancel spectral loss/gain variations regardless of the laser wavelength selected.

In effect, a gain flattening effect is produced just before the photo detector 780. Thus the optical amplifier 790 and spectral filter 775 work together to compensate for the non-uniform losses by detuned wavelength division multiplexer 730 operations. A programmable or agile spectral filter can also be used to optimize the delay line optical response, although those skilled in the art will understand that this is strictly not needed for a pre-engineered delay line system.

For an alternative embodiment, the wide bandwidth single chirped fiber Bragg grating in the FIG. 5a can be removed and the fiber mirrors 760 can be replaced by narrower $\Delta\lambda$ band N chirped fiber Bragg gratings in the fiber array connected to the wavelength division multiplexer 730. In this example, the wide bandwidth chirped fiber Bragg grating is removed from the system, and all bias delays $T_n$ are equal to approximately T in this example. This type of design still forms the hybrid analog-digital VFODL, but requires many more individual dispersive elements.

The same concept can be extended to a transmissive hybrid VFODL design (i.e., FIG. 6) where same length high dispersion fiber lengths are added to the different length single mode fibers in the single mode fiber array shown in FIG. 3 and the $T_n$ bias delays now equal T and the external to the two WDMs single high dispersion fiber-optic removed. Again, this example adds the need for many precise high dispersion fibers with the same exact wavelength sensitive performance.

Also note that VFODL digital delay fiber-based delay count can be increased by using fiber-optic interleavers before the wavelength division multiplexer device. Specifically, one can deploy a 1:2 odd-even channel interleaver device that separates odd and even channel wavelengths. For example, using a single 2:1 interleaver, two wide wavelength separation N channel WDM devices can be used in parallel to generates 2N digital delays using 2N discrete wavelengths that includes N even and N odd wavelengths. For example, N=20 channels, give 2N=40 channels of digital delays. For example, Each WDM device 20 channels with channel separations of 1.6 nm (approximately 200 GHz). Hence all 40 discrete channels on the tunable laser are separated by approximately 0.8 nm (approximately 100 GHz) and the tunable laser needs to scan a bandwidth of approximately 32 nm or about the C-band for ITU telecommunications.

Alternatively, the flat-top passband can be configured of the two WDM devices to be approximately 1 nm. Given a photonic-crystal fiber with a temporal dispersion of approximately 600 ps/km-nm, a km photonic-crystal fiber length provides an approximately 600 ps optical delay for a 1 nm wavelength change in the C-band. Hence, the digital delay line step can be designed to be 600 ps. Given that a tunable laser can step in approximately 0.01 nm resolution or 100 steps, the analog part of the delay line in the proposed design using a 1 km photonic-crystal fiber provides a 6 ps time delay resolution over a 600 ps analog controlled delay and 600 ps×40=24 ns of digital range delays using the 40 channels available from the two wavelength division multiplexers. In effect, the hybrid analog-digital VFODL of the present invention provides time delay over the entire 24 ns time delay range with a 6 ps resolution, in effect, 4000 delay settings or approximately a 12-bit very high performance delay line with very fast nanoseconds reset ability.

Figure 8:
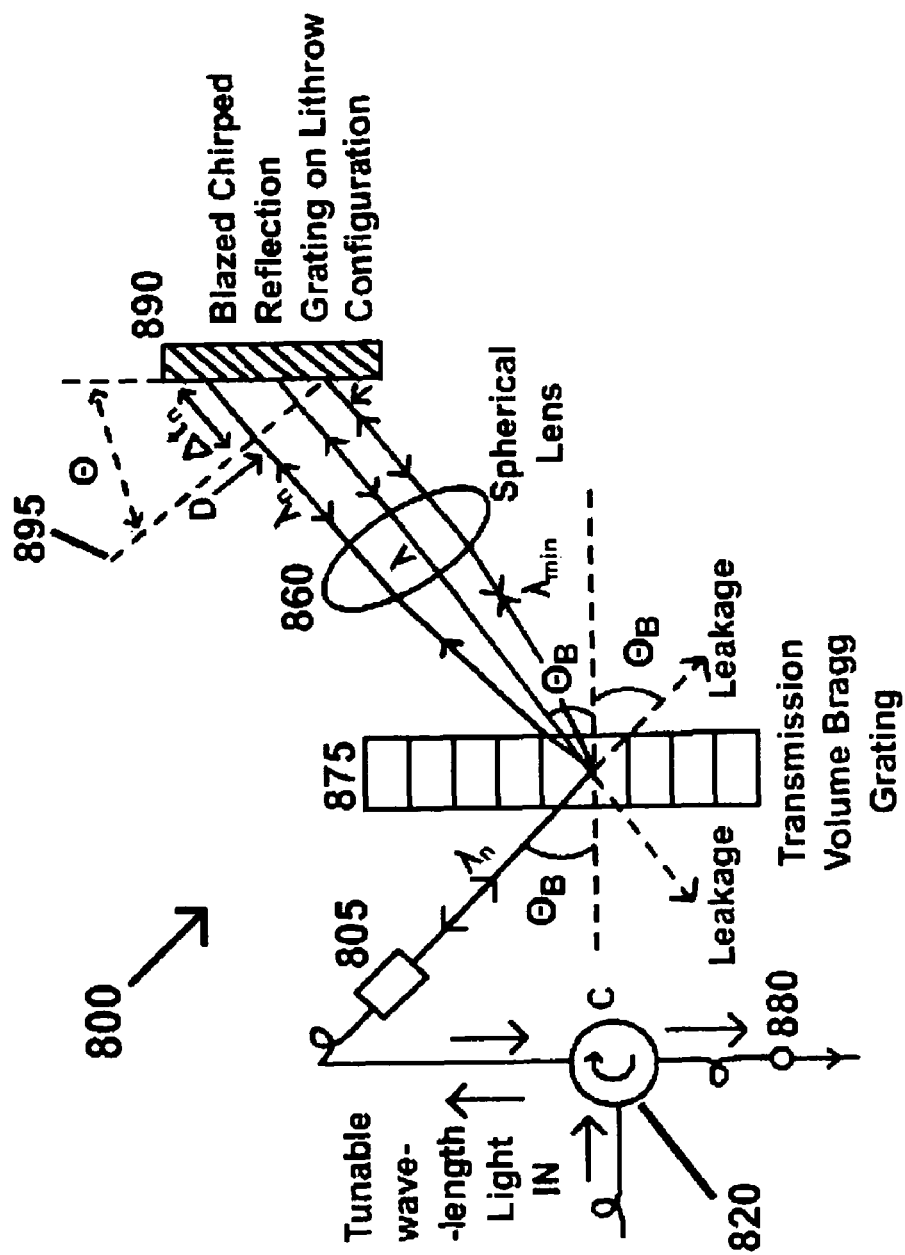
FIG. 8 is a schematic diagram showing an example of an analog-mode variable optical delay line using transmission volume Bragg gratings and Lithrow configuration blazed reflection grating with wavelength tuning to select delay.

There are a number of ways (e.g., via CFBG, dispersive fiber, photonic-crystal fiver) to generate the analog-mode optical delay as shown in the subject application, including the configuration way shown in FIG. 4. Another configuration shown in FIG. 8 shows a new analog-mode variable optical delay line using a transmission volume Bragg grating T (or any transmissive high dispersion prism, e.g., photonic crystal prism) and a Lithrow configuration blazed reflection chirped grating R with wavelength tuning to select delay. The spherical lens 860 after the transmission volume Bragg grating 875 is used to convert the angular displacement of the different tunable laser wavelengths into a parallel beam format configuration that is aligned with the reflection grating 890 for Lithrow configuration diffraction reflecting the incident beam back along the same path from where it originated for optimal coupling into the fiber lens 875 and output via circulator 820 to the photo detector 880. The angle θ of the reflection grating 890 determines how quickly the time delay increases as the wavelength is changed. The physical linear wavelength spread 895 across the full tuned laser band and depends on the transmission volume Bragg grating 875 and the focal length of the spherical lens 860.

For the maximum wavelength change, the max time delay is given by [D tan θ]/c, where c is the speed of light in freespace. For the nth wavelength, the time delay is given by $[d_n \tan \theta]/c$, where $d_n$ is the physical relative beam translation compared to a reference wavelength, e.g., $\lambda_1$. Because the reflection grating 890 is chirped over its physical spatial extent, the different wavelengths corresponding to different linear spatial positions on the reflection grating continues to stay in the Lithrow geometry and light of any wavelength is retro reflected back along its original path as shown by the arrows in FIG. 8 to again pass through the transmission grating 875 and back to the fiber lens 805 to the output port of the circulator 820.

The reflection grating 890 optic angle θ can be changed to change the rate of time delay change with a change in wavelength. In this case, the reflective chirped grating optic 890 also has to be translated along the wavelength spread direction to match the correct grating frequency with the correct Lithrow wavelength of the input light for the given fixed angle θ. Hence, the electrically modulated (or unmodulated) optical signal coming from the tunable laser achieves a given electrical/optical delay based on the chosen input wavelength and the physically stationary angular and spatial position of the given reflection grating 890. By changing the angle and spatial position of reflection grating 890, the rate of change of time delay with wavelength change can be modified, such as when changing the inter-tap delay between different wavelength taps of a multi-wavelength design tunable RF transversal filter when tuning operation is performed. This tilting and translation action of reflection grating 890 can also be used to introduce a specific time delay for a spectrally broadband optical signal such as a short pulse via the concept of adding a linear phase/time delay ramp to the optical spectrum.

Hence, fast mechanical angular and translational actuation of the reflective chirped grating 890 can produce a fast reset time VFODL for broadband optical signals such as needed in Optical Coherence Tomography system and high speed short pulse optical systems including pico and femtosecond lasers. Note that light comes into the processing unit via a tiny core single mode fiber and returns after delay processing via a tiny core single mode fiber. Hence, efficient low loss optical coupling into the single mode fiber after processing requires all returning wavelengths to be on-axis with the fiber lens 805 and all overlapping on the same on-axis spatial region which solver the problems prior works fail to achieve this, see K. F. Kwong, et. al, Optics Letters, Vol. 18, No. 7, April 1993 original design.

The circulator could also be removed by using two slightly vertically displaced fiber lenses and tilt of the reflection grating by a bit in the vertical direction to enable return beam displacement in the vertical direction (into the paper) for proper coupling to the output fiber lens coupled to a SMF. The angular and translation motion of reflection grating is physically implement by one electrically programmable Micro-electro-Mechanical Systems (MEMS) or Nano-electro-Mechanical Systems (NEMS) reflective Spatial Light Modulator (SLM) device that can be electronically and rapidly programmed with a given spatial chirp function (i.e., Lithrow-mode chirped spatial grating) using piston and tilt action of the individual two dimensional (2-D) SLM pixels. In effect, a super high speed VFODL can be designed with great time delay flexibility and excellent broadband light single mode fiber coupling.

An alternate solution to preserve single mode fiber coupling when using a fixed blazed grating such as a fixed spatial frequency grating (not chirped like shown in FIG. 8) is to use the recently proposed double diffraction geometry structure proposed by the inventor in N. A. Riza and S. A. Reza, "Broadband all-digital variable fiber-optic attenuator using Digital Micromirror Device," IEEE Photon. Tech. Letters, Vol. 19, No. 21, p. 1705-07, November 2007. In this example, compared to FIG. 8 design, additional polarization optics such as a Beam Displacing Prism (BDP), a cube Polarization Beam Splitter (PBS), a Half-Wave Plate (HWP), a lens, and a mirror must be used in the VFODL design to preserve broadband light SMF coupled. The mirror can also be a reflective SLM such as a Digital Micromirror Device that is used to program weights on the different wavelength to enable tunable RF/optical filtering operations.

The methods, systems, apparatus and devices of the present invention include the double diffraction configuration with the reflection grating R (in this case a fixed spatial frequency grating) for realizing VFODLs and inherent VOAs. Do note that the FIG. 8 VFODL can also be used to realize a digital or N-state delay line when the chirped reflective grating R is replaced by a discrete array of N spatially offset mirrors (or micromirrors along the R direction), where each vertically oriented mirror corresponds to a specific wavelength or optical delay location so it can act in retroreflection mode.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A variable fiber optic delay line comprising:
   a tunable laser to produce a variable laser input beam for wavelength tuning;
   an input circuit including an electro-optic modulator for receiving and electrically modulating the laser input beam;
   a switchless discrete long time delay module to receive the modulated laser beam, the switchless discrete long delay module including intrinsic variable attenuation coupled with the input circuit, the discrete long delay module including a wavelength division multiplexing coupled fiber array delay line for flat-top passband type multiplexing of the modulated laser beam, the fiber array delay line having a predesigned bias delay for injecting a first time delay into a modulated laser beam to produce a first delayed output signal;
   a switchless analog variable short delay module for receiving the first delayed output signal from the switchless discrete long time delay module and injecting a second time delay that is shorter than the first time delay to produce a delayed output signal having a delay approximately equal to the first time delay plus the second time delay; and
   an optical detector to detect the delayed optical signal and produce a corresponding delayed electrical signal, wherein the delay of the electrical signal is selected by tuning the tunable laser to match one channel of the fiber array delay line to produce a preselected delay of the delayed electrical signal.

2. The variable fiber optic delay line of claim 1 further comprising:
   a non-dispersive single mode fiber for transmission between the input circuit, the discrete long delay module and the analog variable short time delay module.

3. The variable fiber optic delay line of claim 2 further comprising:
   a circulator coupled between the discrete long time delay module and the analog variable short delay module for routing the input laser beam to the discrete long time delay module and routing the first delayed output signal to the analog variable short delay module.

4. The variable fiber optic delay line of claim 1 wherein the switchless analog variable short delay module includes intrinsic variable optical attenuation.

5. The variable fiber optic delay line of claim 4, wherein the switchless analog variable short delay module comprises:
   a single dispersive fiber element to inject a short time delay into the first delayed output signal from the wavelength division multiplexing coupled fiber array delay line; and
   a circulator connected between the wavelength division multiplexing coupled fiber array delay line and the single dispersive fiber element for routing the first delayed output signal to the single dispersive fiber element and routing the delayed output signal having the delay equal to approximately the first time delay and the second time delay.

6. The variable fiber optic delay line of claim 5, wherein the single dispersive fiber element comprises:
   a chirped fiber Bragg grating to cover a full spectral usage of the wavelength division multiplexing coupled fiber array delay line.

7. The variable fiber optic delay line of claim 1 is used for one of a Radio Frequency (RF) and digital electrical signals requiring time delay and amplitude processing.

8. The variable fiber optic delay line of claim 1 is used for optical signal processing.

9. A method for injecting a delay in an optical signal comprising the steps of:
   producing a variable input signal at a tunable laser;
   receiving and electrically modulating the variable input signal at an electro-optic modulator;
   routing the modulated input signal through a three port circulator to a switchless discrete long time delay module;
   injecting a first time delay into a modulated input laser beam at a the switchless discrete long time delay module having a $\Delta\lambda$ flat-top passband type wavelength divisions multiplex device coupled with a parallel fiber array delay, each fiber at a different center wavelength and having a predesigned bias delay for injecting the first time delay into the modulated input signal to produce a first delayed optical signal;
   routing the first delayed optical signal via the circulator from the discrete long time delay module to a switchless analog variable short delay module;
   routing the first delayed optical signal at the switchless analog variable short delay module to a dispersive fiber element;
   injecting a second time delay that is shorter than the first time delay at the switchless analog variable short delay module to produce a delayed output signal having a delay approximately equal to the first time delay plus the second time delay; and
   tuning the variable laser around one of the central wavelengths of one of the fibers in the parallel fiber array delay.

* * * * *